United States Patent [19]
Kennedy

[11] 3,778,116
[45] Dec. 11, 1973

[54] SAFETY DEVICE REQUIRING PERIODIC ATTENTION OF VEHICLE OPERATORS

[76] Inventor: Leroy P. Kennedy, 5118 Hathaway Dr., S.W., Roanoke, Va. 24018

[22] Filed: Apr. 9, 1971

[21] Appl. No.: 132,730

[52] U.S. Cl................. 303/19, 180/99, 340/279
[51] Int. Cl............................................. B60t 7/14
[58] Field of Search ............... 180/99; 303/19, 20; 340/279

[56] References Cited
UNITED STATES PATENTS

| | | | |
|---|---|---|---|
| 3,312,508 | 4/1967 | Keller et al. | 303/19 |
| 3,051,258 | 8/1962 | Byers | 303/19 X |
| 3,623,777 | 11/1971 | Sarbach et al. | 303/20 X |
| 3,177,481 | 4/1965 | Joy et al. | 303/19 UX |
| 3,476,442 | 11/1969 | Sarbach | 303/19 |
| 3,478,201 | 11/1969 | Puri | 303/19 X |
| 3,322,470 | 5/1967 | MacDonald | 180/99 UX |

OTHER PUBLICATIONS

"Electronic Unit Assures Engineman is Alert Constantly," Railway Locomotives and Cars, January 1964, p. 25.

Primary Examiner—Milton Buchler
Assistant Examiner—Stephen G. Kunin
Attorney—Clarence A. O'Brien and Harvey B. Jacobson

[57] ABSTRACT

The control penalty solenoid of an air brake system is maintained energized during a first timing cycle of a control circuit and during a second timing cycle of a time delay relay through which the control circuit and solenoid are energized from a voltage source. Completion of the first timing cycle initiates the second timing cycle during which a warning device alerts the operator. Normal actuation of a reset switch by the operator before completion of the second timing cycle, prevents the energization of the solenoid.

6 Claims, 3 Drawing Figures

PATENTED DEC 11 1973 3,778,116

Leroy P. Kennedy
INVENTOR.

BY Clarence A. O'Brien
and Harvey B. Jacobson
Attorneys

SAFETY DEVICE REQUIRING PERIODIC ATTENTION OF VEHICLE OPERATORS

This invention relates to a safety system for inducing operators of moving vehicles to remain alert by requiring their periodic attention in the performance of a specific duty.

Devices which require periodic attention of a vehicle operator such as the motorman of a railway locomotive, are generally well known. Such warning systems, however, often require radical modification of the air brake system and are therefore relatively limited in installation and function. It is therefore an important object of the present invention to provide a warning system of the foregoing type capable of being readily installed in a conventional type of railway brake system as well as in other installations with a minimum installational effort. A further object is to provide relatively simple and inexpensive a warning system which is adjustable, versatile in use and reliable.

In accordance with the present invention, a solid state control circuit establishes an initial operational stage when connected through a normally closed relay to the electrical power source normally available for energizing the solenoid control of the system. Upon completion of the first operational stage, a second operational stage is initiated characterized by operation of a warning device for alerting the operator. The operator is required to actuate a reset switch during the second operational stage. If the second operational stage is completed without actuation of the reset switch, the control solenoid is deenergized to cause application of the brakes in the case of an air brake system. Further, a control switch remains conductive in order to operate any auxiliary devices. The timing cycle of a time delay relay determines the duration of the second operational stage which may be ten seconds for example compared to a 45 second duration of the first stage. Third stage operation sequentially following the first two stages, is of indefinite duration. However, operation during any of the three stages may be terminated and the system recycled by normal momentary actuation of the reset switch.

The warning system embodies various features which cope with abnormal or unexpected conditions. Should the reset switch be blocked, by failure of the operator to release the same, second such sustained actuation of the reset switch initiates stage operation is initiated immediately followed by third stage operation with deenergization of the control solenoid. Third stage operation on the other hand is initiated immediately if there is any interruption in the supply of power.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
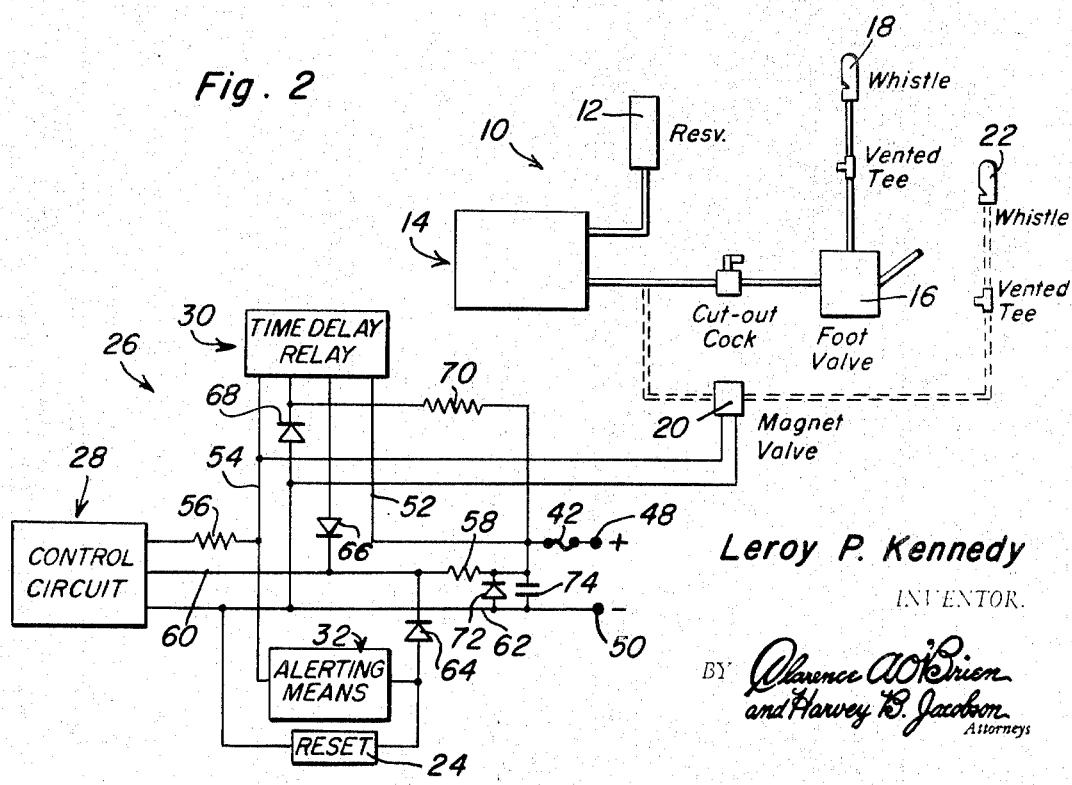
FIG. 2 is a schematic illustration of a system with which the present invention is associated.

Referring now to the drawings in detail, and initially to FIG. 2, the present invention is shown associated with a fluid pressure release type of brake system generally denoted by reference numeral 10 usually installed in a railway locomotive. In such a system, air under pressure from a reservoir 12 is operative through component 14 to maintain the brakes disengaged. Thus, whenever the pressure is relieve, or vented to atmosphere, the brakes are automatically applied as is well known by those skilled in the art. Brake application may thereby be effected by release of air pressure through a foot valve 16 under control of the motorman. When the pressure is relieved by venting of the compressed air through the foot valve, it is conducted through a whistle 18 in order to provide an audible signal of brake application. Such air brake systems are also applied under emergency conditions through a control penalty solenoid valve 20 operative for example to vent the compressed air through another whistle 22 to provide an audible warning of the emergency condition. The control penalty solenoid valve 20 in accordance with the present invention is maintained energized in order to prevent application of the brakes by holding the associated valve closed as long as the operator periodically actuates a reset switch 24 in the electrical control assembly 26 adapted to be connected to the air brake system through the control penalty solenoid valve 20.

Figure 1:
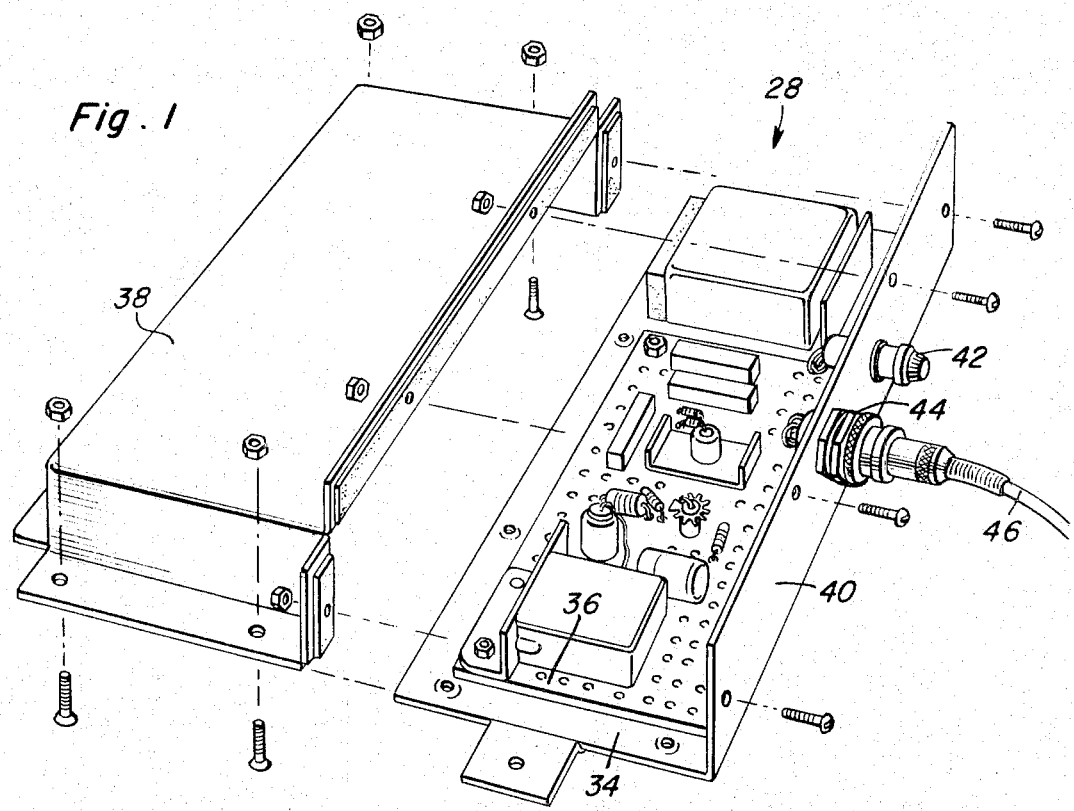
FIG. 1 is a perspective view illustrating a disassembled component associated with the present invention.

The electrical control assembly 26 includes a control circuit component 28 connected to a time delay relay component 30 and a display panel component which includes visible alerting means 32 and the reset switch 24 aforementioned. As shown in FIG. 1, the control circuit component 28 may be conveniently mounted in any suitable location and is provided with a circuit mounting plate 34 to which a circuit board 36 is secured. The mounting plate may be secured to a circuit box enclosure 38 and includes a front panel 40 mounting a safety fuse 42 and a fitting 44 through which the control circuit component 28 is connected by the conductor carrying cable 46 to the other components of the control assembly 26.

Electrical energy is carried to the components of the control assembly 26 from an available source of DC voltage to which the power terminals 48 and 50 are connected as shown in FIG. 2. Power terminal 48 is connected through fuse 42 and conductor 52 to one terminal of the time delay relay component 30, another terminal of which is connected by conductor 54 and resistor 56 to one terminal of the control circuit component 28. The positive power terminal 48 is also connected through a circuit timing resistor 58 and conductor 60 to another terminal of the control circuit component while the negative power terminal 50 is directly connected to a third terminal of the control circuit component through conductor 62. The control penalty solenoid 20 is connected to the conductor 54 and the negative power terminal 50 through conductor 62. The negative power line 62 is also connected to one terminal of the reset switch 24, the other terminal of which is connected through a feedback blocking diode 64 to a terminal of the control circuit component 28 through conductor 60. The conductor 60 is also connected to the time delay relay component 30 through a feedback blocking diode 66. A fourth terminal of the time delay relay is connected to the negative power line 62 through diode 68. Finally, a time control resistor 70 is connected between the positive voltage line 52 and the anode side of the diode 68 connected to the time delay relay component 30.

The circuitry is furthermore protected from transient voltages by means of parallel connected diode 72 and capacitor 74 connected across the power lines 52 and 62. Thus, the diode 72, the capacitor 74 as well as the feedback blocking diodes 64 and 68 prevent any malfunction of the circuit in order to provide operational reliability.

Figure 3:
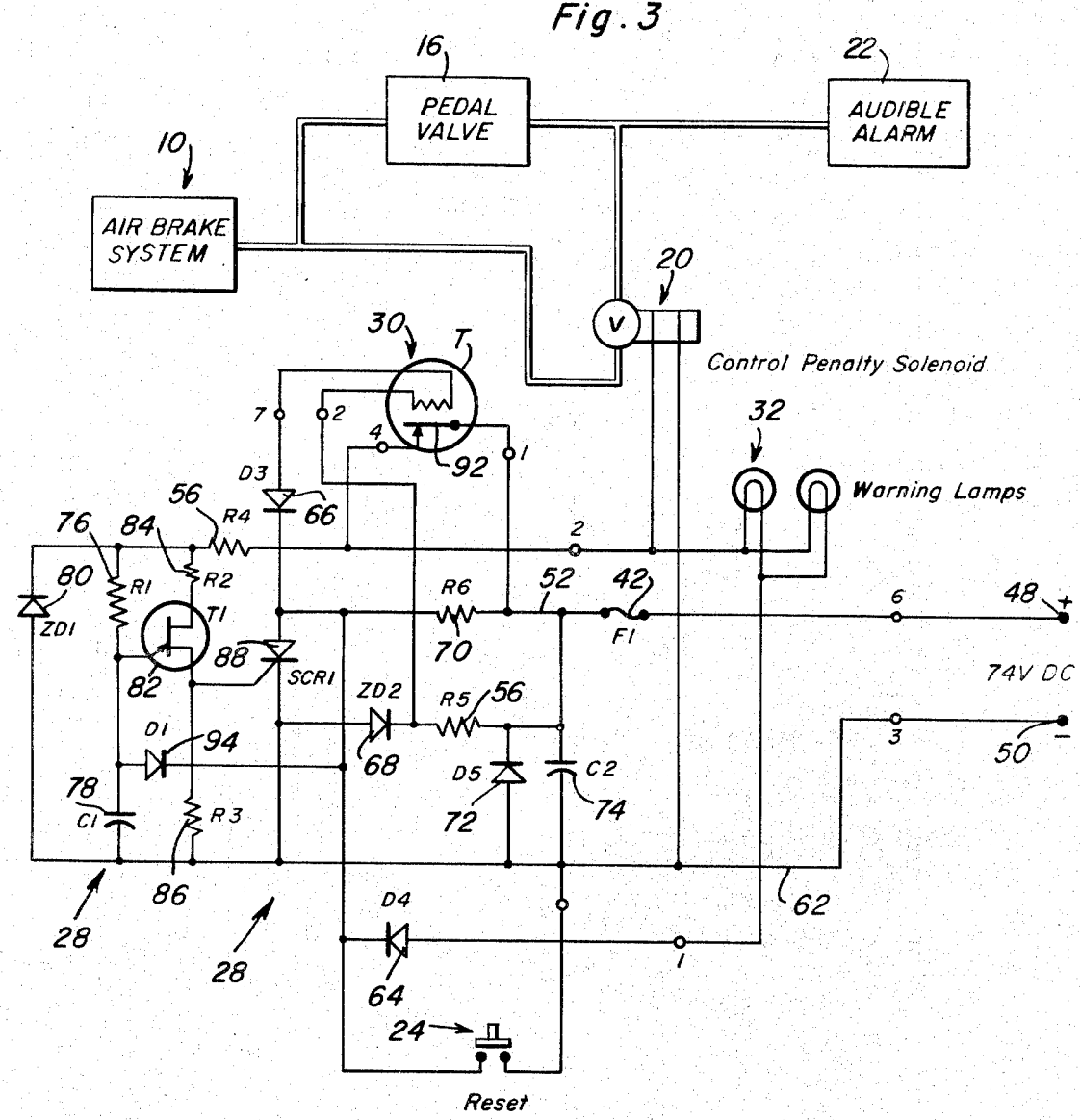
FIG. 3 illustrates an electrical circuit diagram corresponding to the system illustrated in FIG. 2.

The control circuit component 28 is shown in detail in FIG. 3 and includes a timing section consisting of the charging resistor 76 connected in series with a timing capacitor 78 between the coupling resistor 56 and the negative power line 62. The series connected resistor and timing capacitor are connected in parallel with a diode 80 for current flow limiting purposes. Thus, when current is supplied to the timing section through coupling resistor 56, the timing capacitor 78 is charged through resistor 76 until a predetermined switching voltage is built up therein. The juncture between the charging resistor and timing capacitor is therefore connected to the control electrode of a uni-junction transistor 82 that is switched on when the predetermined voltage is established in the capacitor 78 at the end of a first timing cycle. The input and output electrodes of the uni-junction transistor are connected in series between the voltage dividing resistors 84 and 86 respectively connected to the coupling resistor 56 and negative voltage line 62. Accordingly, at the end of the first timing cycle, the uni-junction transistor 82 is rendered conductive to open an electronic switch such as the silicon controlled rectifier 88 supplying current to its gate. The silicon controlled rectifier is connected between the negative voltage line 62 and the circuit holding resistor 70. The anode or input side of the silicon controlled rectifier 88 is also connected to the time delay relay component 30 through the feedback blocking diode 66. Thus, the silicon controlled rectifier 88 is turned on by the output signal of transistor 82 at the end of the first timing cycle thereby completing first stage operation of the control circuit component.

The positive voltage line 52 is connected by the control resistor 58 to one terminal of the time delay relay component 30 for initiating a second timing cycle when a circuit is completed therethrough through the diode 66 and the silicon controlled rectifier 88 upon completion of the first operational stage. Thus, a second timing cycle is initiated at the end of which the normally closed relay switch 92 is opened to disconnect the positive power line 52 from coupling resistor 56 and the warning lamps associated with the alerting means 32. The warning lamps are connected through the feedback blocking diode 64 to the input side of the silicon controlled rectifier 88.

With continued reference to FIG. 3, operation of the warning system will involve three operational stages. The initial or first operational stage is characterized by flow of current through positive voltage line 52 from power terminal 48 through the normally closed relay switch 92 and coupling resistor 56 to the timing section of the control circuit component 28. Current also flows from the normally closed relay switch 92 to the control penalty solenoid 20 for energization thereof in order to maintain the associated valve closed. The warning lamps 32 in this operational stage are not operative. Also, during the first operational stage, the timing capacitor 78 is charged through resistor 76 until the predetermined voltage build-up occurs at the end of the first timing cycle causing the uni-junction transistor 82 to switch on producing a pulse applied to the gate of the silicon controlled rectifier 88 causing it to switch on. Thus, upon completion of the first timing cycle, second stage operation is initiated by completion of an energizing circuit through the time delay relay component 30 by means of the silicon controlled rectifier 88. This energizing circuit includes the control resistor 58 and the feedback blocking diode 66 establishing a second timing cycle at the end of which the normally closed relay switch 92 is opened to complete second stage operation and initiate third stage operation. Further, during second stage operation the silicon controlled rectifier completes an energizing circuit through the warning lamps 32 in series with the feedback blocking diode 64. The warning lamps may be associated with a flasher if desired to alert the operation. If the operator's attention is not obtained during the second timing cycle, upon completion thereof the system enters its third operational stage beginning with the opening of the normally closed relay switch 92.

When the normally closed relay switch 92 is opened at the beginning of third stage operation, power is removed from the timing section of the control circuit component and from the warning lamps 32. However, since the silicon controlled rectifier 88 is already switched on, it remains conductive under a lower voltage applied to the input anode through the circuit holding resistor 70. Accordingly, the control circuit component 28 remains operative to the extent that auxiliary electrical equipment in circuit with the silicon controlled rectifier 88 may remain operative for signaling purposes, for example.

The reset switch 24 may be momentarily closed by normal actuation during any operational stage in order to recycle the system so as to begin operation with the first operational stage as hereinbefore described. It will however be apparent, that the operation is required to normally actuate the reset switch 24 before the end of the second operational stage in order to prevent initiation of third stage operation because third stage operation involves removal of power from the control penalty solenoid thereby permitting the application of the brakes in the air brake system 10. Momentary closing of the reset switch 24 switches off the silicon controlled rectifier 88 by connecting the input anode to the negative voltage line 62. Also, a discharge path from the timing capacitor 78 is completed through diode 94. The control circuit component 28 is thereby reset to recycle the system. Should the reset switch 24 be held closed or blocked, the first stage is by-passed and the second stage operation immediately initiated since a circuit is completed through the time delay relay component 30 by-passing the silicon controlled rectifier. Third stage operation will then begin upon completion of second stage operation if the abnormal condition is not corrected by that time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In combination with an electrical device adapted to be normally energized by a source of electrical voltage, a warning system requiring periodic attention of an operator comprising a control circuit through which a first operational stage is established, relay means operatively connecting said source to the electrical device and to the control circuit for establishing said first stage, means connecting the control circuit to the relay means for initiating a second operational stage upon completion of said first stage, alerting means connected to the relay means for operation in response to completion of the first stage, means connected to the relay means for disabling the alerting means and disconnecting the electrical device from the source during a third stage in response to completion of the second stage, operator actuated reset means connected to the control circuit for recycling the system during any of said stages in response to momentary actuation, and bypass means connecting the reset means to the relay means for promptly initiating the second stage in response to sustained actuation of the reset means.

2. The combination of claim 1 including circuit holding means connected between the source and the control circuit for maintaining the control circuit in operation during said third stage.

3. The combination of claim 2 wherein said circuit holding means is connected in series with the alerting means across the source of voltage during the first stage, and is by-passed by the control circuit during the second stage to operate the alerting means.

4. The combination of claim 1 wherein the electrical device is a solenoid actuated valve in a fluid pressure released type of brake system.

5. In combination with an electrical device adapted to be normally energized by a source of electrical energy, a system for maintaining an operator alert comprising timing means connected to said source for establishing a plurality of operational stages in sequence, reset means responsive to momentary actuation during any of said stages for recycling the timing means, means responsive to sustained actuation of said reset means for bypassing a first of said operational stages, alarm means activated during a second of said operational stages and means for deenergizing said electrical device during a third of said operational stages while the timing means remains energized.

6. In combination with an electrical device adapted to be normally energized by a source of electrical energy, a system for maintaining an operator alert comprising a timer circuit connected to said source for establishing a timing cycle of fixed duration, a normally closed switch connecting said source to the timer circuit, relay means for opening the switch in time delayed response to energization thereof, switch control means connected to the timer circuit for energizing the relay means in response to termination of said timing cycle, means connected to the source for holding the switch control means conductive upon opening of the switch disconnecting the source from the timing means, alarm means connected to the switch control means for energization simultaneously with the relay means, reset switch means connected to the switch control means and momentarily actuated for rendering the switch control means non-conductive, and means connected to the reset switch means for energization of the relay means in response to sustained actuation of the reset switch means.

* * * * *